(12) United States Patent
Motoyama et al.

(10) Patent No.: US 10,523,141 B2
(45) Date of Patent: Dec. 31, 2019

(54) MOTOR CONTROL APPARATUS AND METHOD OF CONTROLLING MOTOR CONTROL APPARATUS

(71) Applicant: CANON KABUSHIKI KAISHA, Tokyo (JP)

(72) Inventors: Masanao Motoyama, Fuchu (JP); Toshiaki Minami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/942,921

(22) Filed: Apr. 2, 2018

(65) Prior Publication Data

US 2018/0294752 A1 Oct. 11, 2018

(30) Foreign Application Priority Data

Apr. 11, 2017 (JP) .................. 2017-078482

(51) Int. Cl.
*H02P 6/15* (2016.01)
*H02P 23/14* (2006.01)

(52) U.S. Cl.
CPC .............. *H02P 6/153* (2016.02); *H02P 23/14* (2013.01)

(58) Field of Classification Search
CPC .......... H02P 6/153; H02P 23/14; H02P 27/08; H02M 17/2506; H02M 1/096; H02M 17/00; G01R 19/2506
See application file for complete search history.

(56) References Cited

U.S. PATENT DOCUMENTS

2003/0173946 A1\* 9/2003 Liu ..................... G01R 19/0092
324/107
2007/0165431 A1\* 7/2007 Gunji ................ H02M 7/53873
363/98
(Continued)

FOREIGN PATENT DOCUMENTS

DE 102015202693 A1 9/2015
EP 2058938 A1 5/2009
(Continued)

OTHER PUBLICATIONS

Extended European Search Report issued in European Appln. No. 18163534.3 dated Sep. 27, 2018.

*Primary Examiner* — Jorge L Carrasquillo
*Assistant Examiner* — Said Bouziane
(74) *Attorney, Agent, or Firm* — Rossi, Kimms & McDowell LLP

(57) ABSTRACT

A motor control apparatus that applies a pulse voltage for each phase of a three phase brushless motor to make current flow, the apparatus provided with: a generating unit for causing the pulse voltage to be generated by shifting the phase of the pulse voltage for each phase of the three phase brushless motor; and a detecting unit for detecting a current flowing to a coil of each phase of the three phase brushless motor to which the pulse voltage is applied by switching by a predetermined sampling period for each phase one-by-one, wherein a relationship between the sampling period of the detecting unit and a phase shift amount of the pulse voltage of each phase generated by the generating unit is set so that the detecting unit can detect the current for each phase of the three phase brushless motor.

20 Claims, 8 Drawing Sheets

(56) References Cited

U.S. PATENT DOCUMENTS

| | | | |
|---|---|---|---|
| 2009/0134826 A1* | 5/2009 | Hamasaki | H02P 6/14 318/400.32 |
| 2012/0163046 A1* | 6/2012 | Hibino | H02P 27/08 363/37 |
| 2014/0077733 A1 | 3/2014 | Kashima et al. | |
| 2015/0008860 A1* | 1/2015 | Lee | H02M 7/53871 318/503 |
| 2016/0254760 A1* | 9/2016 | Zhang | H02M 7/5395 363/95 |

FOREIGN PATENT DOCUMENTS

| | | |
|---|---|---|
| EP | 2410652 A1 | 1/2012 |
| JP | 2008048504 A | 2/2008 |

\* cited by examiner

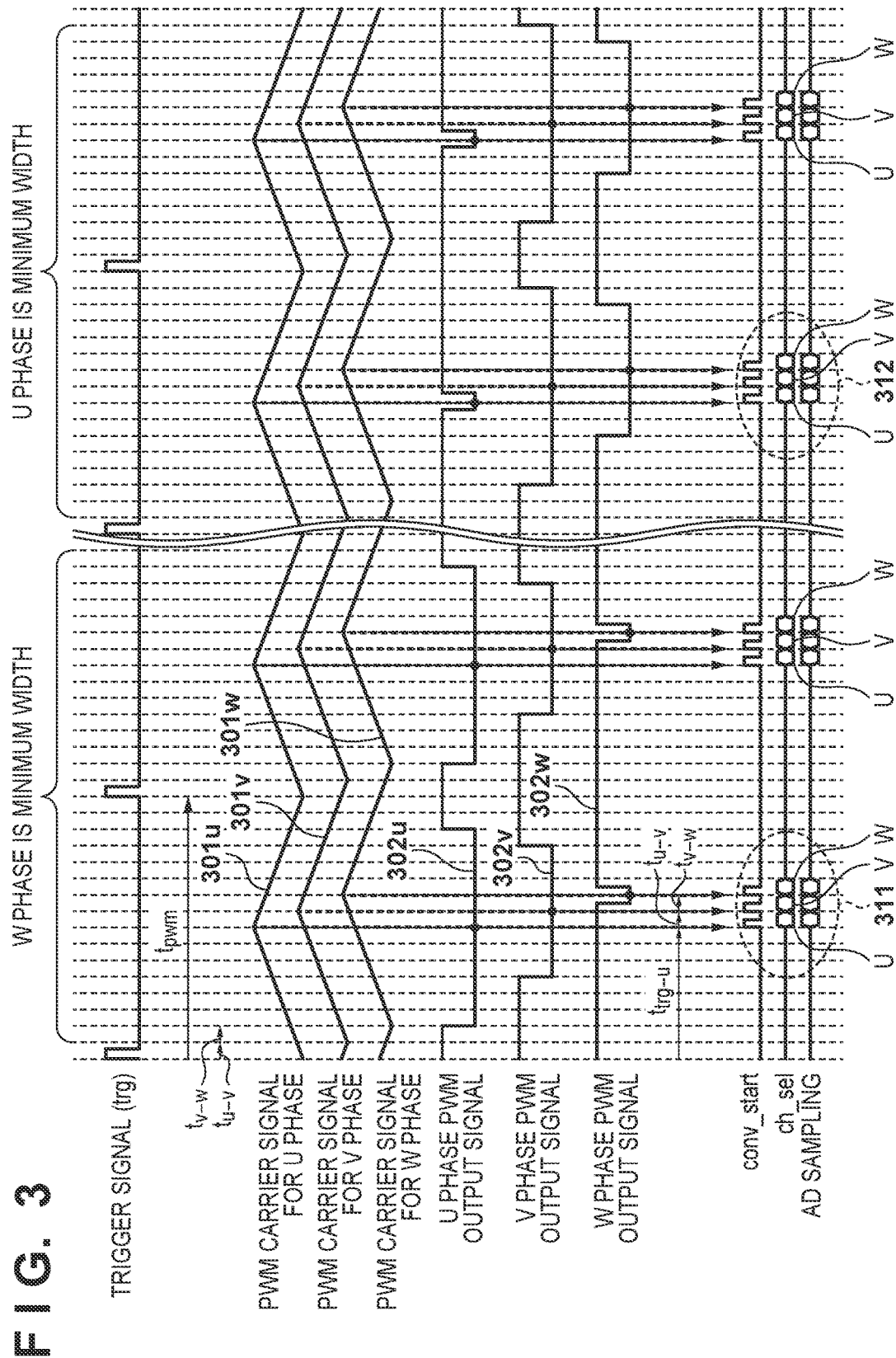

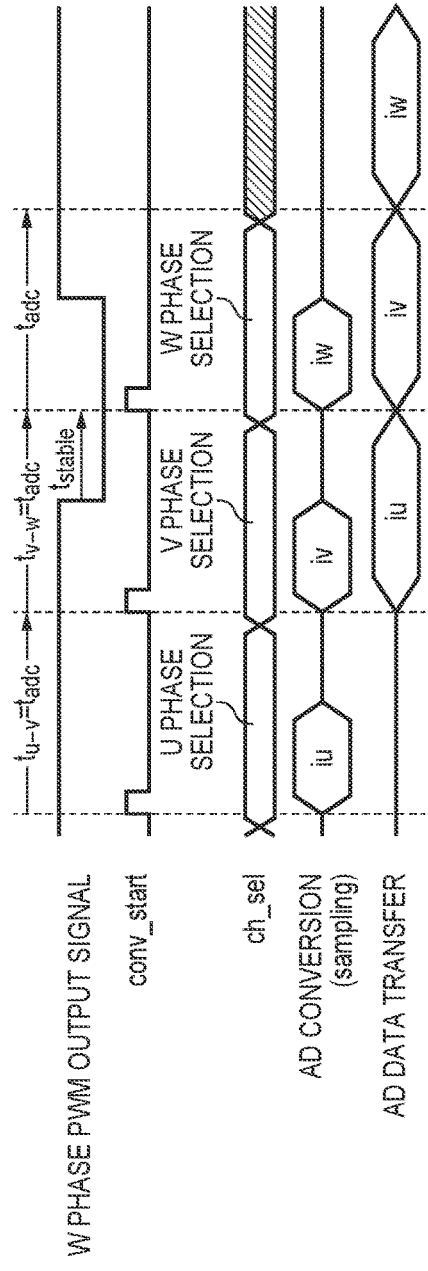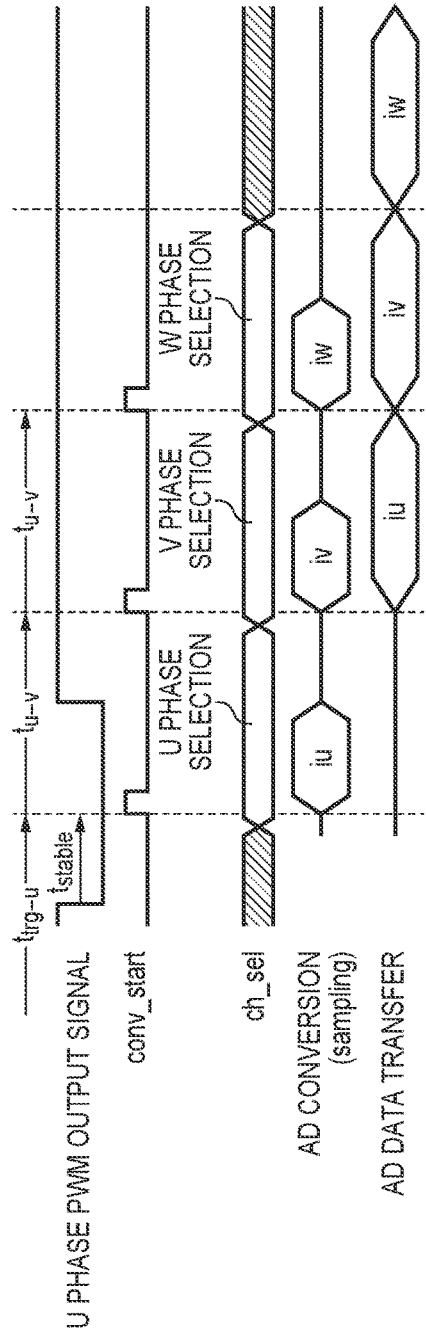

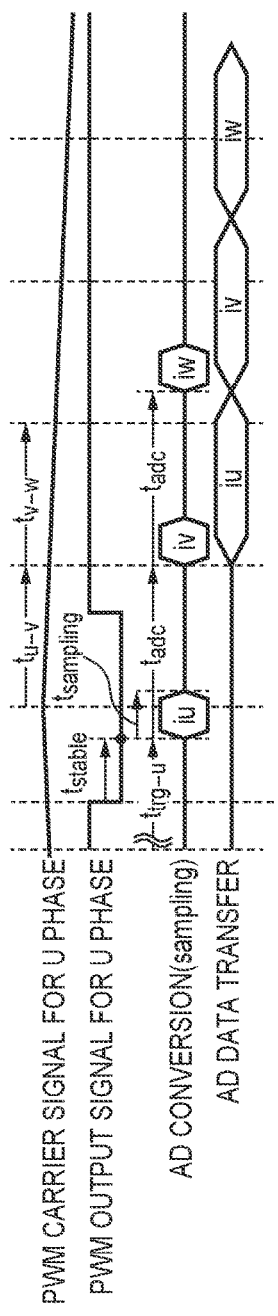
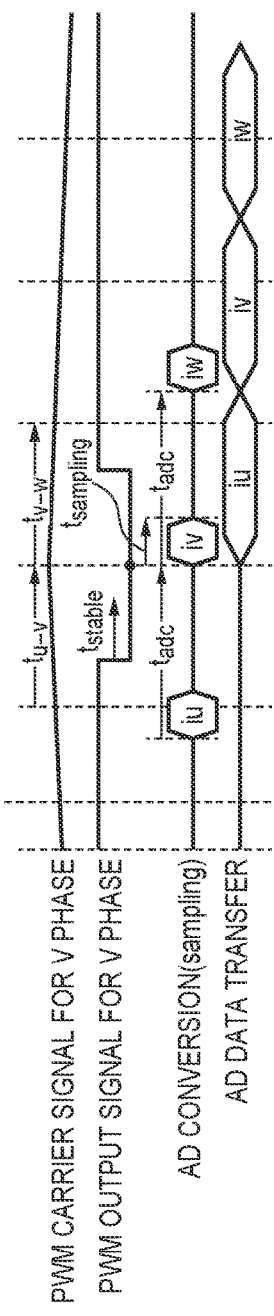
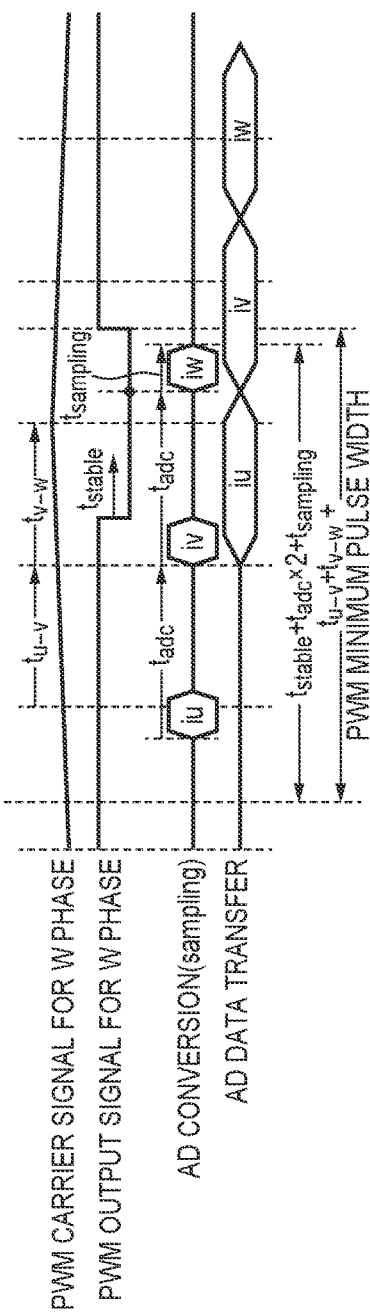
FIG. 5A
FIG. 5B
FIG. 5C

MOTOR CONTROL APPARATUS AND METHOD OF CONTROLLING MOTOR CONTROL APPARATUS

BACKGROUND OF THE INVENTION

Field of the Invention

The present invention relates to a motor control apparatus for a three phase brushless motor, and a method of controlling the motor control apparatus.

Description of the Related Art

A three phase brushless motor has high durability because it does not have brush wear, and is widely used. A typical three phase brushless motor generates rotational torque by flowing a three phase alternating current to three phase coils. In addition, in three phase brushless motors of the past few years, improvements in quietness and driving efficiency have been realized by sinusoidal current drive control using a sinusoidal wave. Furthermore, vector control for precisely controlling the amplitude and phase of a three phase sinusoidal current is becoming typical. In vector control, a three phase brushless motor is driven in accordance with pulse width modulation (hereinafter, PWM driving) for turning on/off a switching element for an inverter based on a command voltage for each phase. In such vector control, it is necessary to accurately detect a current that flows in each of the three phases.

Providing a current sensor for each phase in order to detect the current that flows in each phase of a three phase brushless motor has been performed. However, because current sensors are expensive, this is not suitable for an embedded motor control apparatus. Accordingly, Japanese Patent Laid-Open No. 2008-48504 (hereinafter, D1) proposes a method of using shunt resistors connected in series to respective switching elements of an inverter to estimate current flowing in the three phases from voltages across the two terminals of the shunt resistors.

In D1, a current flowing for each of the three phases is obtained from voltage values of shunt resistors provided for each phase. However, in D1, the voltage values for the shunt resistors provided for each phase are measured, and an AD converter for converting the voltage values to digital values is provided for each phase. In other words, three expensive AD converters are necessary, and there is room for a cost reduction.

SUMMARY OF THE INVENTION

According to one embodiment of the present invention, it is possible to use one AD converter to measure a current value for each phase of a three phase brushless motor.

According to one aspect of the present invention, there is provided a motor control apparatus operable to apply a pulse voltage for each phase of a three phase brushless motor to make current flow, the apparatus comprising: a generating unit configured to cause the pulse voltage to be generated by shifting the phase of the pulse voltage for each phase of the three phase brushless motor; and a detecting unit configured to detect, by switching by a predetermined sampling period for each phase one-by-one, a current flowing to a coil for each phase of the three phase brushless motor to which the pulse voltage is applied, wherein a relationship between the sampling period and a phase shift amount of the pulse voltage of each phase generated by the generating unit is set so that the detecting unit can detect the current for each phase of the three phase brushless motor.

According to another aspect of the present invention, there is provided a method of controlling a motor control apparatus operable to apply a pulse voltage for each phase of a three phase brushless motor to make current flow, the method comprising: causing the pulse voltage to be generated by shifting the phase of the pulse voltage for each phase of the three phase brushless motor; and detecting, by switching by a predetermined sampling period for each phase one-by-one, a current flowing to a coil for each phase of the three phase brushless motor to which the pulse voltage is applied, wherein a relationship between the sampling period and a phase shift amount of the pulse voltage of each generated phase is set so that it is possible to detect the current flowing in the coil for each phase of the three phase brushless motor.

Further features of the present invention will become apparent from the following description of exemplary embodiments (with reference to the attached drawings).

BRIEF DESCRIPTION OF THE DRAWINGS

FIG. 3 is a timing chart illustrating behavior of current detection and PWM output of the first embodiment.

FIGS. 4A and 4B are timing charts illustrating behavior of current detection and PWM output of the first embodiment.

FIGS. 5A, 5B, and 5C are timing charts illustrating behavior of current detection and PWM output of a second embodiment.

DESCRIPTION OF THE EMBODIMENTS

Description is given below for embodiments of the present invention with reference to the attached drawings. Note that the following embodiments do no limit the present invention concerning the scope of the claims, and there is no limitation to a combination of all features described in the following embodiments being necessary for solving means of the present invention.

First Embodiment

Figure 1:
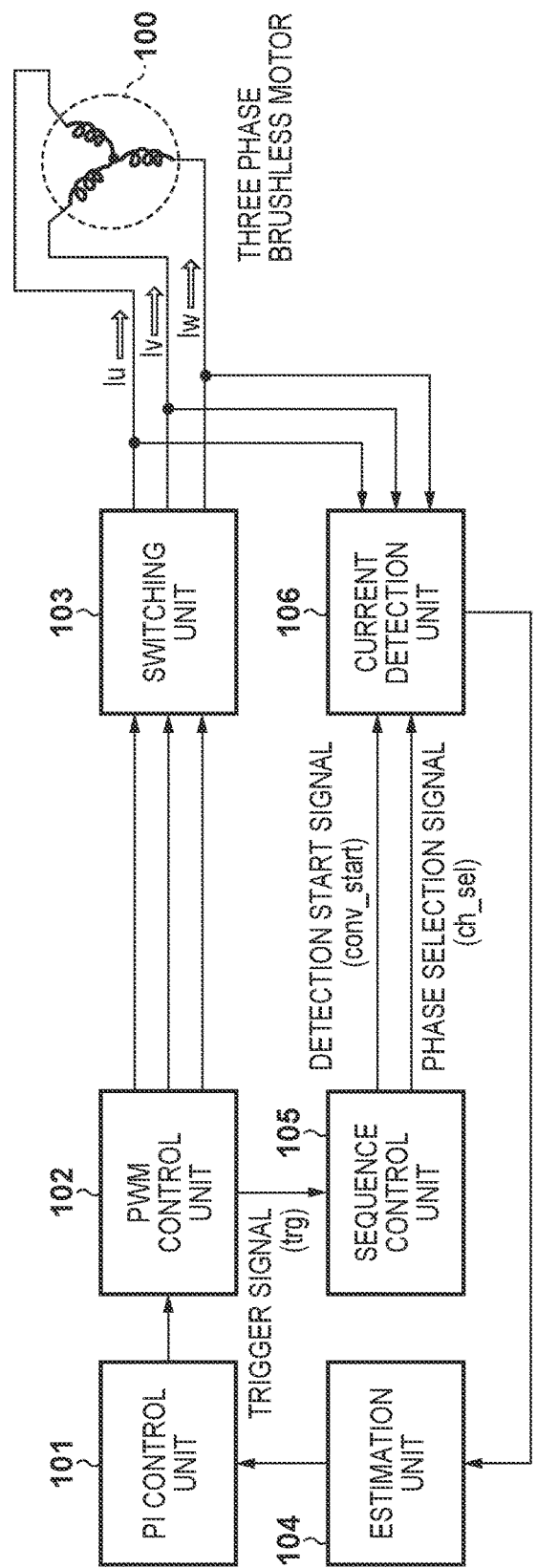
FIG. 1 is a block diagram of a motor control apparatus of a first embodiment.

FIG. 1 illustrates processing blocks of a motor control apparatus according to a first embodiment. The motor control apparatus controls pulse voltages applied for each phase of a three phase brushless motor 100. The motor control apparatus has a PI control unit 101, a PWM control unit 102, a switching unit 103, an estimation unit 104, a sequence control unit 105, and a current detection unit 106.

The current detection unit 106 detects a current (a coil current) flowing to the coil of each phase of the three phase brushless motor 100 by switching between each single phase at a predetermined sampling period. The timing and phase for detecting a current is controlled in accordance with a phase selection signal (ch_sel) and a detection start signal (conv_start) outputted from the sequence control unit 105. The estimation unit 104 estimates a speed or position (electrical angle) of the motor from the coil current detected by the current detection unit 106. The PI control unit 101 performs proportional integral control based on the speed and the motor position estimated by the estimation unit 104, and generates and outputs a command value for each phase.

The PWM control unit 102 is provided with a counter for each phase, and generates a PWM carrier signal for each phase by periodically incrementing/decrementing these counters. In addition, the PWM control unit 102 compares the command values from the PI control unit 101 with a PWM carrier signal (count value), to thereby generate a PWM output signal (also referred to as a pulse voltage) to be applied to each coil terminal of the three phase brushless motor. By shifting the counter for each phase, the PWM control unit 102 causes a pulse voltage whose phase is shifted for each phase of the three phase brushless motor 100 to be generated. In addition, the PWM control unit 102 to the sequence control unit 105 outputs a trigger signal (trg) for notifying start of a rotation control period. The sequence control unit 105, based on the trigger signal (trg) inputted from the PWM control unit 102, outputs the detection start signal (conv_start) for indicating a timing for executing current detection and a phase selection signal (ch_sel) indicating selection of a phase that is to be a target of the current detection. The switching unit 103 drives the three phase brushless motor 100 by turning on/off a current that flows to each phase coil of the three phase brushless motor 100 in accordance with the PWM output signal from the PWM control unit 102. Note that, in the present embodiment, the three phase brushless motor has a first phase, a second phase, and a third phase in an order from a fastest phase, and the current detection unit 106 detects currents in this order. The first phase, the second phase, and the third phase are respectively recited below as a U phase, a V phase, and a W phase.

Figure 2:
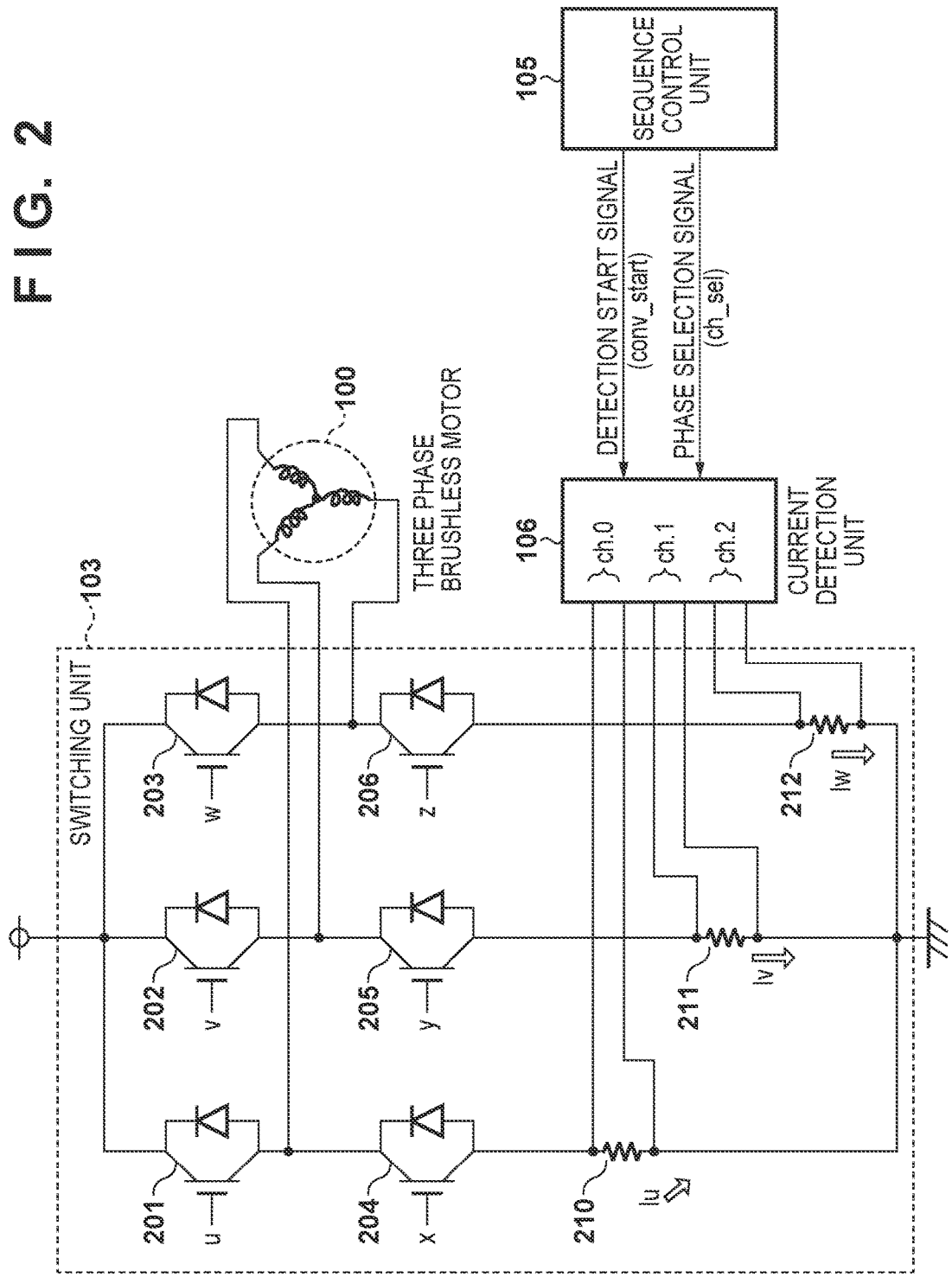
FIG. 2 is a block diagram of a switching unit that includes a shunt resistor for current detection of each phase.

FIG. 2 is a block diagram for illustrating details of the switching unit 103 and the current detection unit 106. The switching unit 103 has a bridge configuration in accordance with a U phase H side FET 201, a U phase L side FET 204, a V phase H side FET 202, a V phase L side FET 205, a W phase H side FET 203, and a W phase L side FET 206. FET means field-effect transistor. Shunt resistors 210 through 212 are connected in series between GND and the L side FETs 204 through 206 for each phase. The H side FETs 201 through 203 for each phase turn on when the PWM output signal for the corresponding phase is High, and the L side FETs 204 through 206 for each phase turn on when the PWM output signal for the corresponding phase is Low. Accordingly, in this bridge configuration, in the case of the U phase for example, the FET 201 turns on at the same time the FET 204 turns off, and the FET 201 turns off at the same time the FET 204 turns on. When the FET 204 turns on, a current Iu flows to the shunt resistor 210. Similarly, in the case of the V phase, when the FET 205 turns on at the same time the FET 202 turns off, a current Iv flows to the shunt resistor 211. In the case of the W phase, when the FET 203 turns off at the same time the FET 206 turns on, a current Iw flows to the shunt resistor 212.

The current detection unit 106 detects the voltages between the shunt resistors and GND by an A/D converter, and divides the detected voltage values by the shunt resistor values to calculate current values. The A/D converter may be an externally-attached IC, and may be a macro or IP that is embedded internally such as a microcomputer or an ASIC.

In the embodiment, there is one A/D converter, and it is configured by being used time-divisionally while switching channels. In other words, the voltage across the two terminals of the shunt resistor 210 in a channel 0 is detected, the voltage across the two terminals of the shunt resistor 211 in a channel 1 is detected, and the voltage across the two terminals of the shunt resistor 212 in a channel 2 is detected.

Upon receiving the detection start signal (conv_start) outputted by the sequence control unit 105, the A/D converter starts detecting voltage values of the channel selected by the phase selection signal (ch_sel) outputted by the sequence control unit 105. Note that, in the present embodiment, as the current detection unit 106, a method for detecting the voltage value of the shunt resistors by an A/D converter is used, but there is no limitation to this, and it is sufficient if a configuration in which it is possible to detect the current of each phase sequentially is taken.

Figure 8:
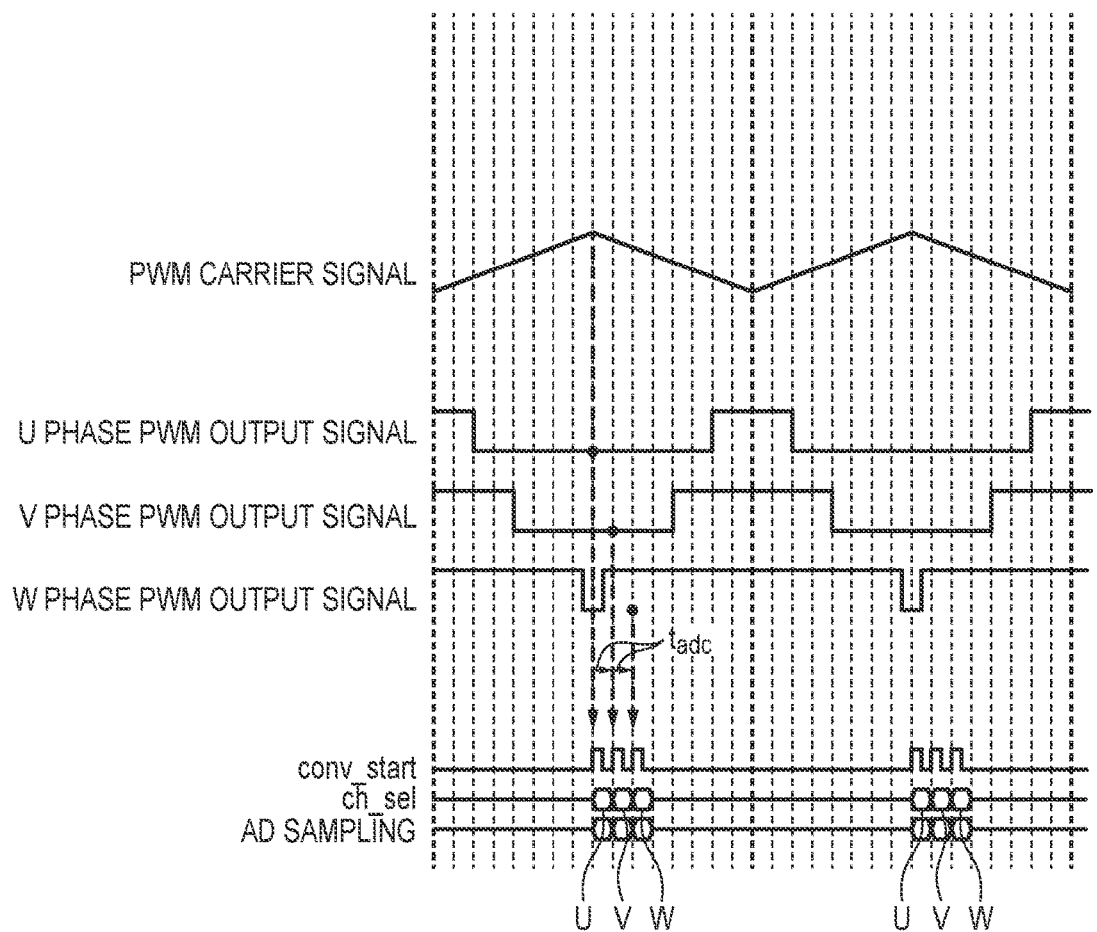
FIG. 8 is a view illustrating a relationship between a typical sampling period and a phase difference of a carrier signal.

As described above, in the embodiment, one AD converter is used for the three shunt resistors 210 through 212, and the channel is switched in an order of the U phase→the V phase→the W phase to detect the current values. In accordance with a PWM driving pattern, there are cases where an on time for a switching element in a certain phase becomes very small. In such a case, a case where, when this order for detecting the current of a phase reaches the end, current detection cannot complete within the time when the switching element is on can occur. For example, in FIG. 8, a case where PWM output signals for the U phase, the V phase, and the W phase are generated as illustrated based on one PWM carrier signal is considered. In such a case, the on time of the W phase switching element is short, and when the current values are detected by a sampling period $t_{adc}$ in the order of the U phase→the V phase→the W phase, it ceases to be possible to complete current detection within the time when the W phase switching element is on. In other words, a case such as where an incorrect current value (a current value for a time when the switching element is not on) is measured occurs. In the present embodiment, it is necessary to restrict the PWM driving pattern (make a minimum pulse width be greater than or equal to a predetermined width) so that such a case does not occur. Note that the sampling period $t_{adc}$ is an amount of time the current detection unit 106 (an AD converter) needs from the start of current detection for one phase worth of the three phase brushless motor 100 until the start of current detection for the next phase. More specifically, the sampling period is decided by a total of the sampling time in accordance with the AD converter and the amount of time needed to switch channels, for example. Alternatively, it is decided by a data transfer time needed to transfer data that has been subject to an AD conversion to the estimation unit 104, for example.

In the present embodiment, the phase of the PWM output signal for each phase is shifted in order to make it possible to reliably measure the current value of the three phases while overcoming or reducing restrictions of the PWM driving pattern. This phase shift amount is decided based on a relationship among time intervals (sampling periods) the current detection unit 106 needs for current value detection for each phase. More specifically, a relationship among a sampling period of the current detection unit 106 and a phase shift amount of the pulse voltage of each phase of the three phase brushless motor that is generated by the PWM control unit 102 is set so that the current detection unit 106 can detect the current for each phase of the three phase brushless motor. Furthermore, in detail, it is desirable that the phase shift amount is set so that the current of each phase in accordance with the pulse voltage of the minimum pulse width of each phase that is generated by the PWM control unit 102 can be detected by the current detection unit 106. In the first embodiment, the PWM control unit 102 generates PWM carrier signals (triangle waves) in which the phase is shifted by the amount of the ADC sampling period ($t_{adc}$) for each phase of U, V, and W, and generates a PWM output signal (u, v, w, x, y, z) in which the phase is shifted for each phase of U, V, and W. In other words, the phase shift amount of the PWM output signals (pulse voltages) generated by the PWM control unit 102 matches with an amount of time needed from when the current detection unit 106 starts current detection for one phase of the three phase brushless motor 100 until starting current detection for the next phase.

Figure 7A:
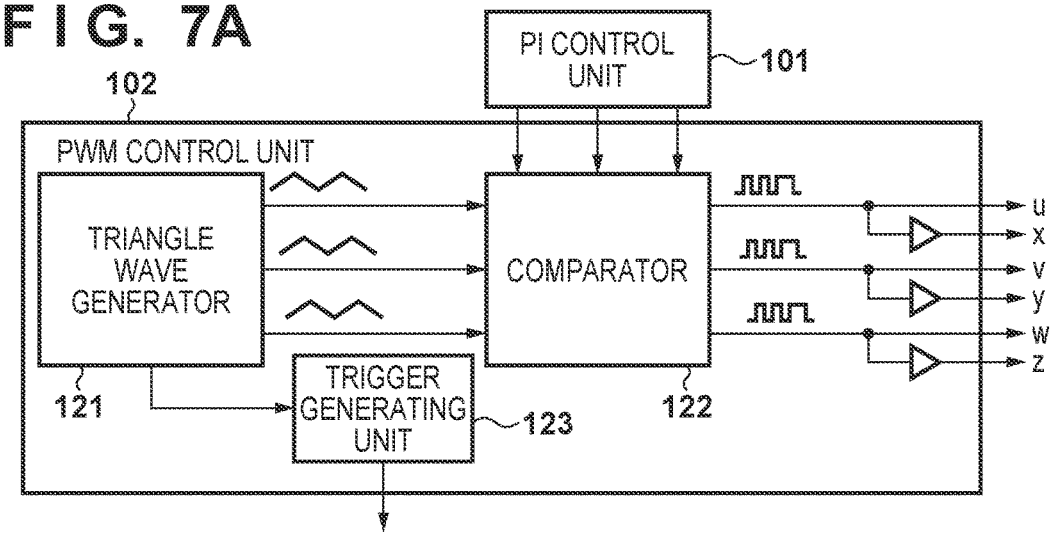
FIGS. 7A, 7B, and 7C are block diagrams illustrating configuration examples of a PWM control unit 102.

FIG. 7A is a block diagram that illustrates an example of a configuration of the PWM control unit 102 which generates PWM output signals having shifted phases. A triangle wave generator 121 generates a PWM carrier whose phase is shifted for each of the U phase, the V phase, and the W phase, and provides them to a comparator 122. The comparator 122 compares a command value from the PI control unit 101 for each phase with the corresponding PWM carrier from the triangle wave generator 121, and outputs the PWM output signal (u, v, w, x, y, z). More specifically, the triangle wave generator 121 has three counters for each phase of the three phase brushless motor 100, and generates a PWM carrier signal (triangle wave) for each phase by periodically incrementing/decrementing the counters. The comparator 122 generates the pulse voltage for each phase in accordance with a comparison between the count value of the three counters and the command value from the PI control unit 101. Accordingly, the phase shift amount of the pulse voltage is decided in accordance with a shift amount of the count values of the three counters of the triangle wave generator 121. In addition, a trigger generating unit 123 generates and outputs a trigger signal (trg) based on the value of the counter for generating the PWM carrier signal for the U phase.

FIG. 3 is a timing chart for describing a sampling operation of the current detection unit 106 and the PWM output signals generated in the PWM control unit 102. Reference numerals 301u, 301v, and 301w are PWM carrier signals for generating PWM output signals for each the U phase, the V phase, and the W phase respectively, in the PWM control unit 102. Incrementing/decrementing is repeated every rotation control period ($t_{pwm}$: for example 100 µs) for the PWM carrier signals.

$t_{u-v}$ is a phase difference between the PWM carrier signal 301u for the U phase and the PWM carrier signal 301v for the V phase (in other words, a phase difference between the center of respective pulses). In addition, $t_{v-w}$ is a phase difference for the PWM carrier signal 301v for the V phase and the PWM carrier signal 301w for the W phase. In the first embodiment, the triangle wave generator 121 is controlled so that a phase difference of PWM carrier signals with respect to the period $t_{adc}$ for the current detection unit 106 to measure and transfer a current value is the same, in other words so that $t_{u-v}=t_{v-w}=t_{adc}$.

The reference numerals 302u, 302v, and 302w are PWM output signals for the U phase, the V phase, and the W phase respectively. These PWM output signals are generated by the comparator 122 comparing the command value for each phase from the PI control unit 101 with the PWM carrier signal for the corresponding phase. Note that the PWM output signal 302u is a waveform for driving the FET 204, the PWM output signal 302v is a waveform for driving the FET 205, and the PWM output signal 302w is a waveform for driving the FET 206. When a respective PWM output signal is at the L-level, this means that a respective one of the corresponding FET 204, FET 205 and FET 206 is on.

The trigger signal (trg) is issued at a start timing for each rotation control period by the PWM control unit 102 (the trigger generating unit 123). However, generation of a trigger signal is not limited to this. For example, instead of a configuration for generating a trigger signal by the PWM control unit 102, configuration may be such that a timer module (not shown) issues a trigger signal, the PWM control unit 102 generates a PWM carrier signal based on this, and the sequence control unit 105 generates a detection start signal and a phase selection signal.

Upon receiving the trigger signal (trg), the sequence control unit 105 waits a predetermined amount of time ($t_{trg-u}$). At this point, letting a waiting time from when the PWM output signal changes to when the current value becomes stable be $t_{stable}$, the predetermined waiting time $t_{trg-u}$ can be represented by Equation 1.

$$t_{trg-u} = \text{rotation control period} \div 2 - (\text{PWM minimum pulse width} \div 2) + t_{stable} \quad \text{[Equation 1]}$$

After waiting the predetermined waiting time $t_{trg-u}$ after receiving the trigger signal (trg), the sequence control unit 105 selects the U phase by the phase selection signal (ch_sel), and issues the detection start signal (conv_start) to the current detection unit 106. Upon receiving the conv_start signal, the current detection unit 106 obtains a current value for the phase selected by ch_sel (the U phase here).

In a state where the U phase is selected, after $t_{u-v}$ ($=t_{adc}$) from when the conv_start signal is issued, the sequence control unit 105 selects the V phase by ch_sel, and issues conv_start. By this the current detection unit 106 obtains a current value for the V phase. In a state where the V phase is selected, after $t_{v-w}$ ($=t_{adc}$) from when the conv_start signal is issued, the W phase is selected by ch_sel, and conv_start is issued. By this the current detection unit 106 obtains a current value for the W phase. By the above, current values for the U phase, the V phase, and the W phase are sequentially obtained.

By performing the foregoing control, it is possible to make the relation between the timing of the apex of each PWM carrier signal and the timing for detecting a current value of each phase by the current detection unit 106 be constant. Accordingly, it is possible to obtain the current value for each phase near the timing for the apex of the PWM carrier signal for each phase, and it is possible to more reliably measure the current value of each phase.

A detailed timing chart in a time domain 311 of FIG. 3 is illustrated in FIG. 4A. As illustrated in FIG. 4A, even if the on time of the W phase switching element (the FET 206) is a minimum, obtainment of the current value for the W phase by the current detection unit 106 completes in the period when the switching element is on (while the PWM output signal is Low). In addition a detailed timing chart in a time domain 312 of FIG. 3 is illustrated in FIG. 4B. As illustrated in FIG. 4B, even when the on time of the U phase switching element (the FET 204) is a minimum, it is understood that obtainment of a current value for the U phase by the current detection unit 106 completes in the period when the switching element is on. In addition, in the present embodiment, a current value for the U phase is detected at the timing of $t_{trg-u}$, and subsequently a current value for each phase is detected at a sampling period $t_{adc}$ equal to a phase shift amount for the pulse voltage that is applied to each phase. As a result, the current detection unit 106 can detect the current of each phase in a period remaining after subtracting, from the minimum pulse width of each phase generated by the PWM control unit 102, a stabilization time the switching element requires for application of the pulse voltage. Accordingly, even if there is a time period in which the U phase and the V phase become the minimum pulse width with the passage of time, it is possible to reliably detect the current value of each phase.

By the above, even in a case where channels are switched to sequentially detect current values for three shunt resistors 210 through 212 by one AD converter, even for the current value of a phase for which the on time of a switching element is very short, it is possible to reliably detect this value within this on time. Note that, in the foregoing embodiment, description is given of an example of application to sensorless vector control for estimating motor position/speed from current values, but similar application is possible even in a case of performing vector control by using a sensor. In such a case, a result of current detection is only used in the current control in the PI control unit 101.

Figure 7B:
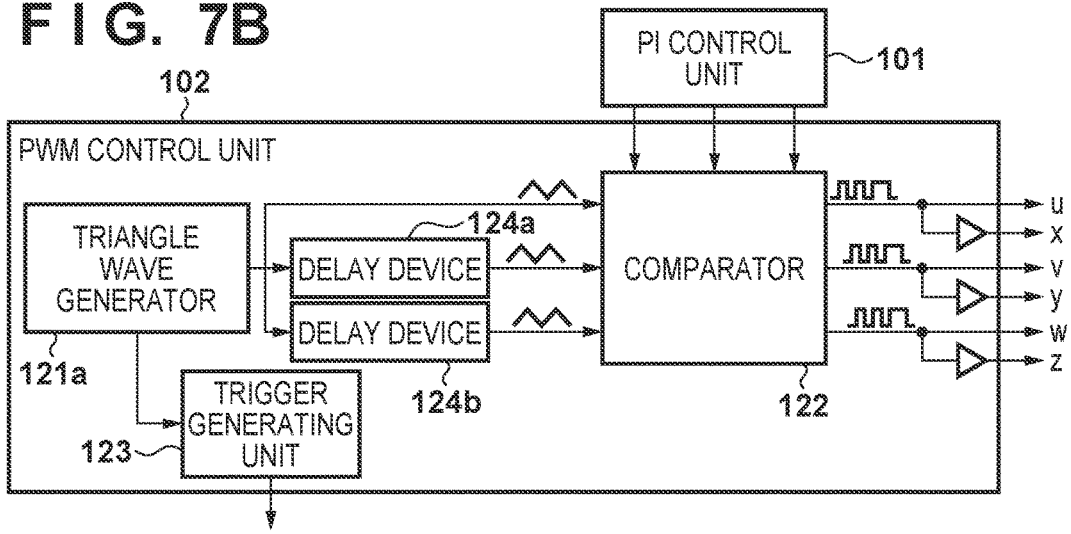

In addition, the PWM carrier signal for each phase was described as something generated in accordance with a counter for a respective phase, but generation may be performed from a common counter without holding a counter separately for each phase. In addition, configuration may be taken to generate one PWM carrier signal, and use a delay circuit to delay the PWM carrier signal. In such a case, the PWM control unit 102 has for example one counter and a delay unit for delaying a count value thereof, and generates a PWM carrier signal (count value) for each phase of a three phase brushless motor in accordance with the delay unit. The phase shift amount of the pulse voltage applied to each phase is controlled in accordance with a delay time of the delay unit. A more detailed example of a configuration for such a case is illustrated in FIG. 7B. In FIG. 7B, a triangle wave generator 121a generates a PWM carrier signal (count value) in accordance with one counter. This PWM carrier signal is the PWM carrier signal for the U phase. A delay device 124a delays the PWM carrier signal generated by the triangle wave generator 121a by $t_{adc}$ to generate the PWM carrier signal for the V phase. A delay device 124b delays the PWM carrier signal generated by the triangle wave generator 121a by $t_{adc} \times 2$ to generate the PWM carrier signal for the V phase.

Figure 7C:
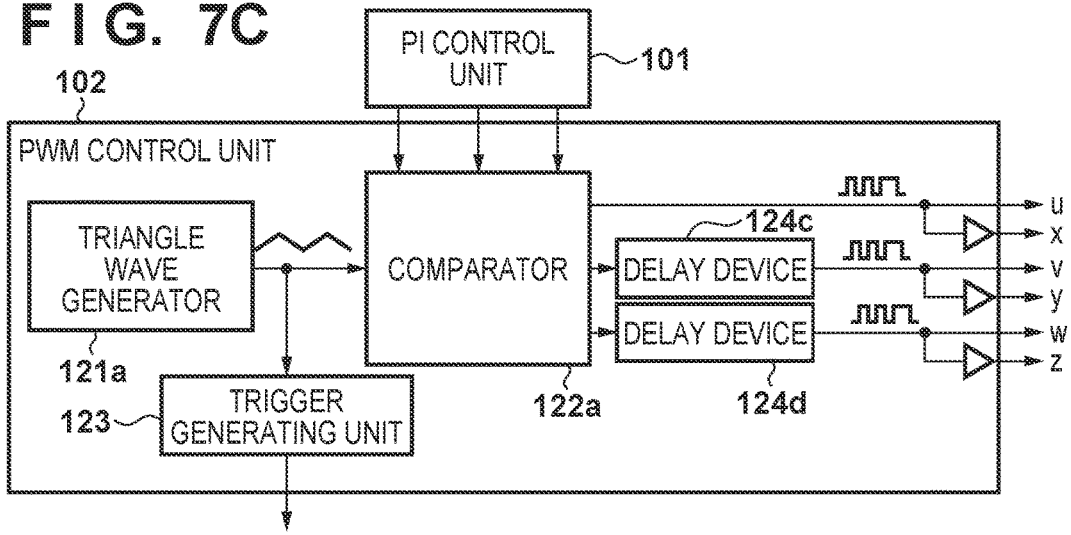

In addition, configuration may be taken such that the PWM control unit 102 generates the pulse voltage for each phase in accordance with a comparison with one PWM carrier (the count value of the counter) and a command value for each phase, and delays the generated pulse voltage by a delay amount that differs for each phase. In this case as well, the phase shift amount of the pulse voltage is controlled in accordance with a delay time of the delay unit. A more detailed example of a configuration for such a case is illustrated in FIG. 7C. FIG. 7C illustrates a configuration in which a common PWM carrier signal (count value) is used to delay a generated PWM output signal (pulse voltage). The triangle wave generator 121a outputs one PWM carrier signal, and a comparator 122a compares this carrier signal with a command value from the PI control unit 101 to generate PWM output signals for the U phase, the V phase, and the W phase. However, the generated PWM output signal for each phase is generated from one PWM carrier signal, and thus its phase is not shifted. Accordingly, PWM output signals for respective phases are shifted by delay devices 124c and 124d. In other words, the delay device 124c delays the PWM output signal for the V phase that is generated by the comparator 122a by $t_{adc}$. In addition the delay device 124d delays the PWM output signal for the W phase that is generated by the comparator 122a by $t_{adc} \times 2$.

As described above, by the first embodiment, in a case of sequentially detecting current values by switching channels by one AD converter with respect to three shunt resistors, even with a current value of a phase for which the on time of the switching element is very short, it is possible to detect the current value in that time. Consequently, it becomes possible to drive a motor by PWM driving at a higher frequency than conventionally, in other words at a faster number of rotations than conventionally, it is possible to provide a motor control apparatus having high reliability and vector control with good driving efficiency.

Second Embodiment

In the first embodiment, configuration was such that phase shift amounts of PWM carrier signals ($t_{u-v}$, $t_{v-w}$) are equal to the sampling period $t_{adc}$, but there is no limitation to this. In other words, the phase shift amounts of the PWM carrier signal (or pulse voltage) do not need to necessarily match with the sampling period of the current detection unit 106. If the timing for sampling a current value matches with a timing when the PWM output signal of a phase that is a sampling target becomes Low, it is possible to detect the current value of each phase.

FIGS. 5A, 5B, and 5C are views that illustrate cases when the sampling period $t_{adc}$ of the current detection unit 106 is larger than a phase shift amount ($t_{u-V}$, $t_{v-w}$) of the PWM carrier signal. $t_{sampling}$ of FIGS. 5A, 5B, and 5C indicates sampling time the AD converter needs for current detection for one phase. FIG. 5A indicates current value obtainment timing for the U phase when the PWM output signal for the U phase is a minimum pulse width. Because $t_{stable}$<PWM minimum pulse width/2 typically, the start of the obtainment of the current value of the U phase is before the apex of the PWM carrier signal, and in other words is before the center of the Low section of the PWM output signal.

FIG. 5B indicates current value obtainment timing for the V phase when the PWM output signal for the V phase is a minimum pulse width. Obtainment of the current value for the V phase is started after the sampling period $t_{adc}$ elapses from the sampling start timing for the U phase ($t_{trg-u}$). FIG. 5C indicates current value obtainment timing for the W phase when the PWM output signal for the W phase is a minimum pulse width. Obtainment of the current value for the W phase is started after the sampling period $t_{adc}$ elapses from the sampling start timing for the V phase.

As described above, by obtaining the current value while the PWM output is Low, it is possible to achieve an effect similar to that of the first embodiment even when the PWM phase shift and the sampling period which is the period for obtainment of a current value do not completely match, and the sampling period is longer than the phase shift. However, there is a need for the amount of time from the start of current detection for the U phase whose current is detected first until the completion of current detection for the W phase whose current is detected last to fit in the amount of time from after the stabilization time in the minimum pulse width of the U phase elapses until a trailing edge of the pulse voltage in the minimum pulse width of the W phase. In other words, configuration is such that the stabilization time and an amount of time B from the start of sampling of the U phase until the completion of sampling of the W phase are included within an amount of time A that adds the PWM minimum pulse width and the phase shift amount between the PWM carrier signal for the U phase and the PWM carrier signal for the W phase. The amount of time A is represented as "$t_{u-v}+t_{v-w}$+PWM minimum pulse width". In addition, the amount of time B is represented as "$t_{stable}+t_{adc}\times 2+t_{sampling}$". Accordingly, the sampling period $t_{ads}$ ($t_{adc}>t_{u-v}$) needs to satisfy the conditions of the following Equation 2.

$$t_{stable}+t_{adc}\times 2+t_{sampling})<(t_{u-v}+t_{v-w}+\text{PWM minimum pulse width}) \quad \text{[Equation 2]}$$

Figure 6A:
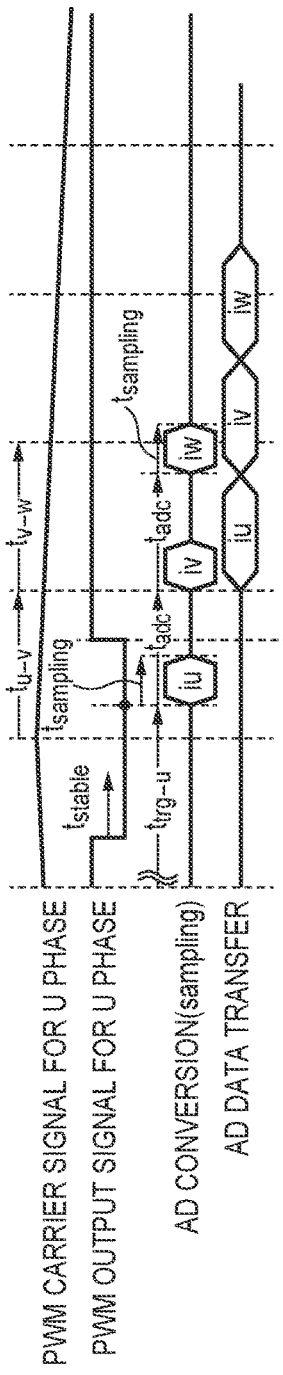
FIGS. 6A, 6B, and 6C are timing charts illustrating behavior of current detection and PWM output of a second embodiment.
Figure 6B:
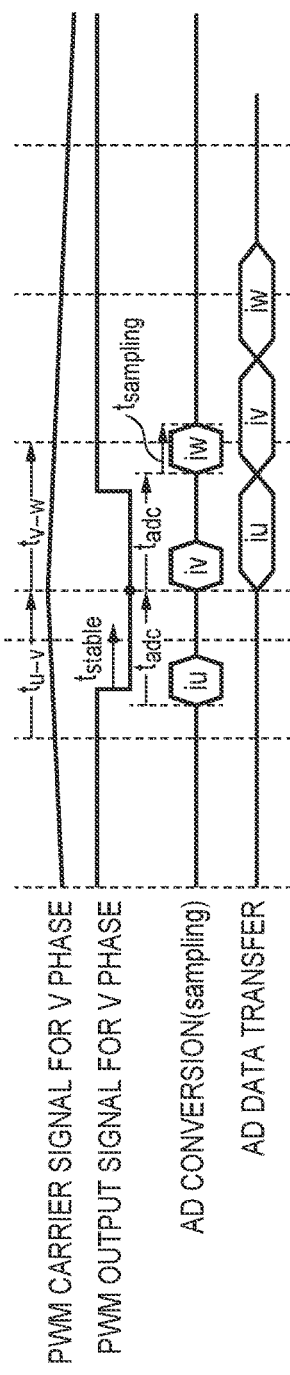
Figure 6C:
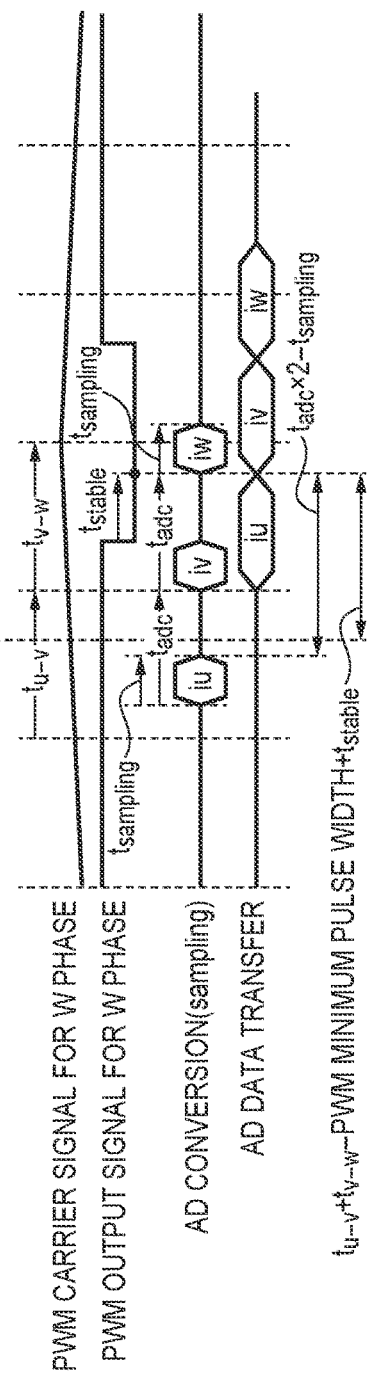

In addition, FIGS. 6A, 6B, and 6C are views that illustrate cases where the sampling period $t_{adc}$ of the current detection unit 106 is less than a phase difference (tu-v, $t_{v-w}$) of the PWM carrier signal. FIG. 6A indicates current value obtainment timing for the U phase when the PWM output signal for the U phase is a minimum pulse width. When the sampling period $t_{adc}$ is smaller than the phase difference of the PWM carrier signal, the current value obtainment timings for the V phase and the U phase are decided based on the current value obtainment timing of the W phase as illustrated in FIG. 6C. In the example of FIG. 6A, the current value obtainment start timing of the U phase is after the apex of the PWM carrier signal, in other words PWM is after the center of the Low section, and sampling ends within the Low section of the PWM output signal.

FIG. 6B indicates current value obtainment timing for the V phase when the PWM output signal for the V phase is a minimum pulse width. Similarly to the U phase, timings for starting and ending sampling are within the section where PWM is Low. FIG. 6C indicates current obtainment timing for the W phase when the PWM output signal for the W phase is a minimum pulse width. After the PWM output signal for the W phase becomes Low, waiting is performed for stabilization ($t_{stable}$) obtainment of the current value starts thereafter, and obtainment completes while the PWM output signal is Low. In order to realize this timing, in this embodiment, a time of $t_{trg-u}+(t_{u-v}+t_{v-w})-t_{adc}\times 2$ after the reception of the trigger signal (trg) is set as the current value obtainment start timing for the U phase. In this way, by obtaining the current value while the PWM output is Low, it is possible to achieve a similar effect to that of the first embodiment even when the PWM phase shift does not completely match the period of current value obtainment and the period of current value obtainment is shorter.

Note that, in such a case, there is a need for an amount of time from the end of current detection for the U phase whose current is detected first until the start of current detection for the W phase whose current is detected last to be longer than an amount of time from the end of the minimum pulse width of the U phase until the stabilization time in the minimum pulse width of the W phase to elapse. In other words, it is necessary for an amount of time C from a time when sampling of the current value of the U phase ends until sampling of the current value of the W phase starts to be longer than an amount of time D resulting from adding the stabilization time from the time from the end of the PWM minimum pulse of the U phase to the start of the PWM minimum pulse of the W phase. The amount of time C is "$t_{adc}\times 2-t_{sampling}$" and the amount of time D is "$t_{u-v}+t_{v-w}-$PWM minimum pulse width+$t_{stable}$". Accordingly, the sampling period $t_{adc}$ ($t_{adc}<t_{u-v}$) needs to satisfy the conditions of the following Equation 3.

$$(t_{adc}\times 2-t_{sampling})>(t_{u-v}+t_{v-w}-\text{PWM minimum pulse width}+t_{stable}) \quad \text{[Equation 3]}$$

Note that an upper limit (a PWM minimum pulse width) for a PWM duty value outputted by the PWM control unit 102 may be decided based on the foregoing phase shift amount $t_{u-v}=t_{v-w}$.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-078482, filed Apr. 11, 2017, which is hereby incorporated by reference herein in its entirety.

What is claimed is:

1. A motor control apparatus operable to apply a pulse voltage for each phase of a three phase brushless motor to make current flow, the apparatus comprising:
   a generating circuit configured to cause the pulse voltage to be generated by shifting the phase of the pulse voltage for each phase of the three phase brushless motor;
   a control circuit configured to output a phase selection signal and a detection start signal; and
   a current detector configured to detect, when the detection start signal is output, by switching by a predetermined sampling period for each phase one-by-one in accordance with the phase selection signal, a current flowing to a coil for each phase of the three phase brushless motor to which the pulse voltage is applied,
   wherein the generating circuit has a counter configured to periodically increment and decrement a count value, and is configured to generate the pulse voltage for each phase in accordance with a comparison between a count value of the counter and a command value for each phase, and
   wherein a relationship between the sampling period and a phase shift amount of the pulse voltage of each phase generated by the generating circuit is set so that the current detector can detect the current for each phase of the three phase brushless motor.

2. The apparatus according to claim 1, wherein the phase shift amount is set so that the current detector can detect the current of each phase in accordance with a pulse voltage of a minimum pulse width of each phase generated by the generating circuit.

3. The apparatus according to claim 2, wherein the phase shift amount is set so that the current detector can detect the current of each phase in a period resulting from subtracting a stabilization time required by a switching element for application of a pulse voltage from a minimum pulse width of each phase generated by the generating circuit.

4. The apparatus according to claim 3, wherein the phase shift amount of the pulse voltage generated by the generating circuit matches an amount of time needed from when the current detector starts one phase worth of current detection until the current detector starts current detection for a subsequent phase.

5. The apparatus according to claim 4, wherein the start of the current detection in a first phase whose current is detected first out of the three phase brushless motor is after the stabilization time elapses from a start of application of the pulse voltage of the minimum pulse width for the first phase.

6. The apparatus according to claim 3, wherein
the phase shift amount of the pulse voltage generated by the generating circuit is shorter than an amount of time required from when the current detector starts one phase worth of current detection until the current detector starts current detection for a subsequent phase, and
an amount of time from the start of the current detection in a first phase whose current is detected first until the current detection in a third phase whose current is detected last completes fits in an amount of time from after the stabilization time elapses in the minimum pulse width of the first phase until a trailing edge of a pulse voltage in the minimum pulse width of the third phase.

7. The apparatus according to claim 3, wherein
the phase shift amount of the pulse voltage generated by the generating circuit is longer than an amount of time required from when the current detector starts one phase worth of current detection until the current detector starts current detection for a subsequent phase, and
an amount of time from the end of the current detection in a first phase whose current is detected first until the start of the current detection in a third phase whose current is detected last is longer than an amount of time from the end of the minimum pulse width of the first phase until the stabilization time in the minimum pulse width of the third phase elapses.

8. The apparatus according to claim 1, wherein counter is provided for each phase of the three phase brushless motor, the generating circuit is configured to generate the pulse voltage for each phase in accordance with a comparison between a count value of the counter for each phase and the command value for each phase, and control the phase shift amount of the pulse voltage in accordance with a shift amount of a count value of the counter provided for each phase.

9. The apparatus according to claim 1, wherein the generating circuit has a delay unit configured to cause a count value of the counter to be delayed, is configured to generate a count value for each phase of the three phase brushless motor by delaying a count value of the counter using the delay unit, generate the pulse voltage for each phase in accordance with a comparison with the count value for each phase and the command value for each phase, and control the phase shift amount of the pulse voltage in accordance with a delay time of the delay unit.

10. The apparatus according to claim 1, wherein the generating circuit is configured to generate a pulse voltage for each phase in accordance with a comparison between a count value of the counter and the command value for each phase, has a delay unit configured to delay the generated pulse voltage by a differing delay time for each phase, and is configured to control the phase shift amount of the pulse voltage in accordance with a delay time of the delay unit.

11. A method of controlling a motor control apparatus operable to apply a pulse voltage for each phase of a three phase brushless motor to make current flow, the method comprising:
generating the pulse voltage by shifting the phase of the pulse voltage for each phase of the three phase brushless motor;
outputting a phase selection signal and a detection start signal; and
detecting, when the detection start signal is output, by switching by a predetermined sampling period for each phase one-by-one in accordance with the phase selection signal, a current flowing to a coil for each phase of the three phase brushless motor to which the pulse voltage is applied,
wherein, in the generating, the pulse voltage for each phase is generated in accordance with a comparison between a count value and a command value for each phase, the count value is periodically incremented and decremented by a counter, and
wherein a relationship between the sampling period and a phase shift amount of the pulse voltage of each generated phase is set so that it is possible to detect the current flowing in the coil for each phase of the three phase brushless motor.

12. The method according to claim 11, wherein the phase shift amount is set so that it is possible to detect the current of each phase in accordance with a pulse voltage of a minimum pulse width of each generated phase.

13. The method according to claim 12, wherein the phase shift amount is set so that it is possible to detect the current of each phase in a period resulting from subtracting a stabilization time required by a switching element for application of a pulse voltage from a minimum pulse width of each generated phase.

14. The method according to claim 13, wherein the phase shift amount of the generated pulse voltage matches an amount of time needed from the start of one phase worth of current detection until the start of current detection for a subsequent phase.

15. The method according to claim 14, wherein the start of the current detection in a first phase whose current is detected first out of the three phase brushless motor is after the stabilization time elapses from a start of application of the pulse voltage of the minimum pulse width for the first phase.

16. The method according to claim 13, wherein
the phase shift amount of the generated pulse voltage is shorter than an amount of time required from the start of one phase worth of current detection until the start of current detection for a subsequent phase, and
an amount of time from the start of the current detection in a first phase whose current is detected first until the current detection in a third phase whose current is detected last completes fits in an amount of time from after the stabilization time elapses in the minimum pulse width of the first phase until a trailing edge of a pulse voltage in the minimum pulse width of the third phase.

17. The method according to claim 13, wherein
the phase shift amount of the generated pulse voltage is longer than an amount of time required from the start of one phase worth of current detection until the start of current detection for a subsequent phase, and
an amount of time from the end of the current detection in a first phase whose current is detected first until the start of the current detection in a third phase whose current is detected last is longer than an amount of time from the end of the minimum pulse width of the first phase until the stabilization time in the minimum pulse width of the third phase elapses.

18. The method according to claim 11,
wherein the counter is provided for each phase of the three phase brushless motor and a count value for each phase is generated by the counter provided for each phase, and
wherein, in the generating, the pulse voltage for each phase is generated in accordance with a comparison between the count value for each phase and the command value for each phase, and the phase shift amount of the pulse voltage is controlled in accordance with a shift amount of the count value for each phase.

19. The method according to claim 11, wherein, in the generating, a count value for each phase of the three phase brushless motor is generated by delaying the count value of the counter, the pulse voltage for each phase is generated in accordance with a comparison between the count value for each phase and the command value for each phase, and the phase shift amount of the pulse voltage is controlled in accordance with an amount of time of the delay.

20. The method according to claim 11, wherein, in the generating, a pulse voltage for each phase is generated in accordance with a comparison between the count value and the command value for each phase, the generated pulse voltage is delayed by a delay amount that differs for each phase, and the phase shift amount of the pulse voltage is controlled in accordance with an amount of time of the delay.

* * * * *